Patented Sept. 2, 1947

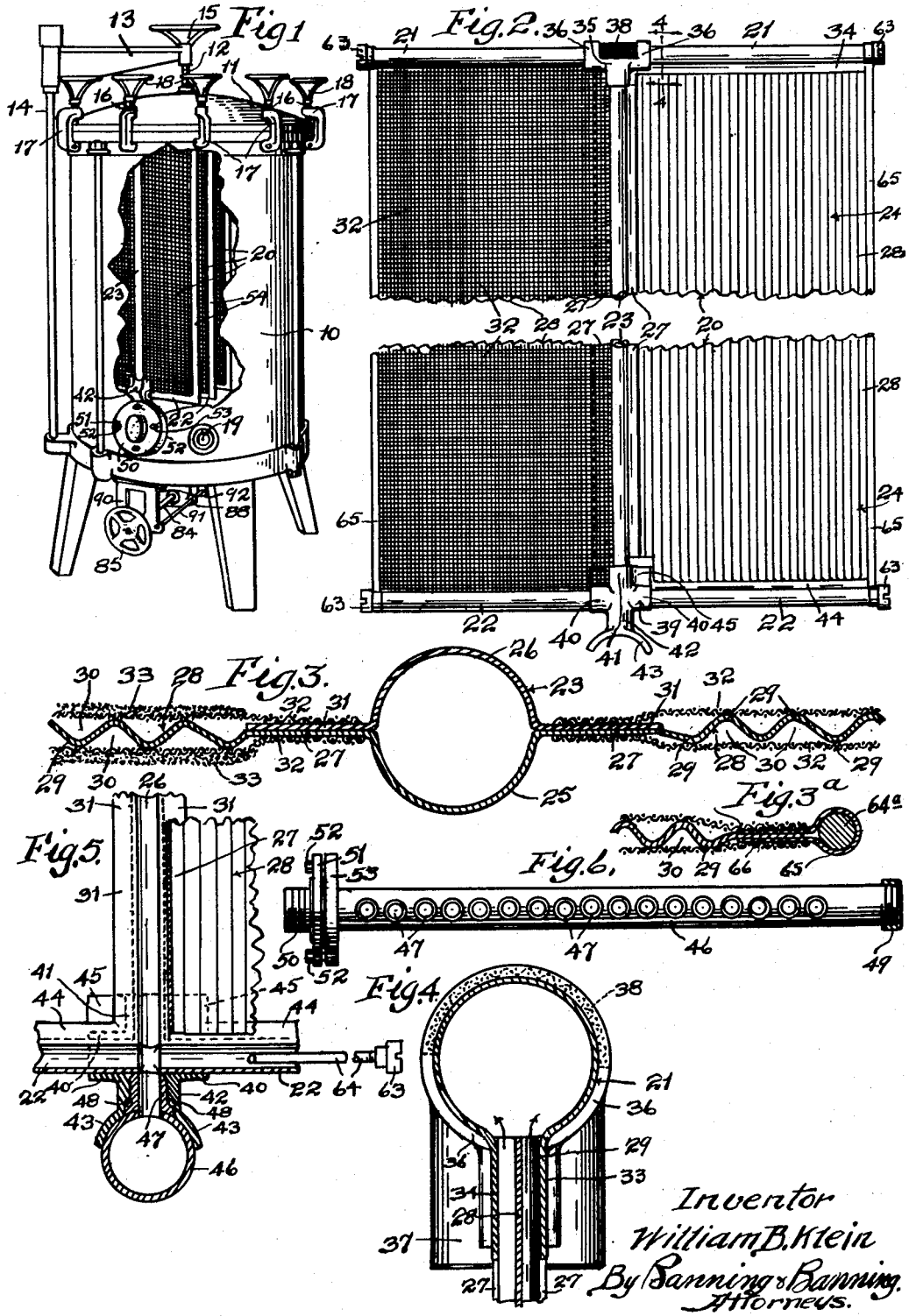

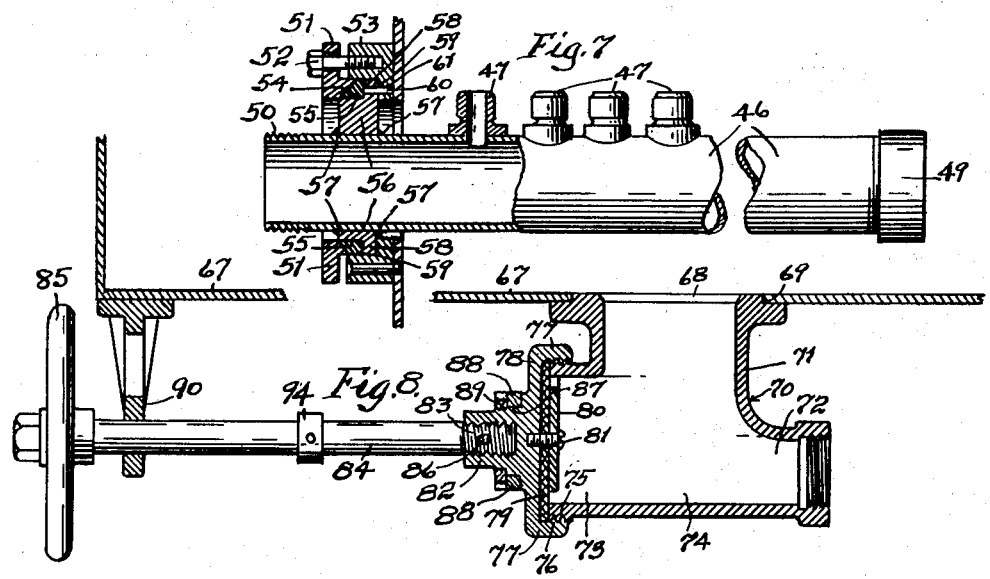
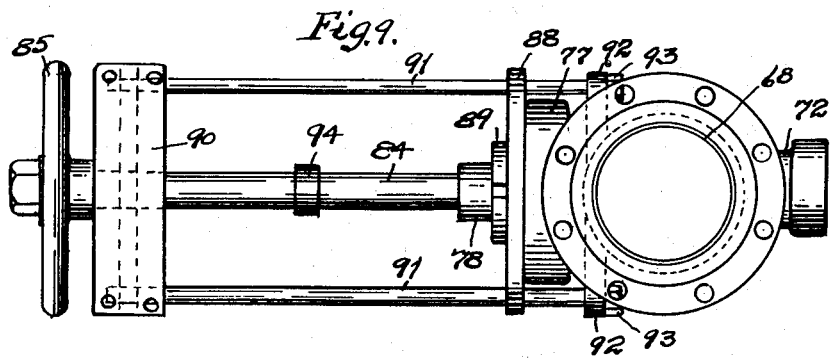
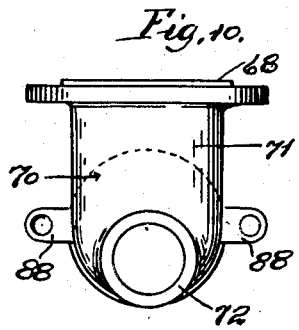

2,426,618

UNITED STATES PATENT OFFICE 2,426,618

FILTER

William B. Klein, Chicago, Ill.

Application October 23, 1944, Serial No. 559,870

6 Claims. (Cl. 210—181)

The filter of the present invention is of the class which employs diatomaceous earth or the like to filter liquids containing solids in suspension and the objects of the present invention are to provide filter leaves which are so constructed as to secure a uniform consistent flow and a high clarity of filtrate. In filters of this general character, means are provided for building up a deposit of the filtering medium on a very fine mesh screen or the like, which deposit serves as the filtering medium which not only prevents the passage of the diatomaceous particles contained in the slurry admitted to the tank, but also removes all foreign matter in suspension so that the liquid finally discharged from the filter leaves will be clear and unpolluted by foreign material.

The present invention is directed particularly to the formation of the screen grids which provide a mounting for the mesh upon which the filtering medium is deposited. The screen grids of the present invention are in the form of corrugated plates in which the channels afforded by the corrugations run longitudinally (preferably vertically) in conjunction with upper and lower headers into which the ends of the grid plates project and which thus afford passageways for the discharge of the filtered liquid. At the same time the corrugated formation of the grid plates themselves permits the latter to be formed of relatively thin sheet material, such as stainless steel or the like, while providing sufficient stiffness and rigidity, with a minimum of weight consistent with the strength required.

The grid plates thus formed provide on opposite sides, a multiplicity of uninterrupted channels which afford no barriers to the liquid flow and may be readily cleaned by swinging back the cover and flushing the interior of the tank and the filtering elements with a hose as will more fully appear from the following description.

The filter, as a whole, is so constructed as to be easily accessible and the filter leaves themselves may be individually removed or replaced without difficulty as occasion may require.

Further objects and details will appear from a description of the invention in conjunction with the accompanying drawings; wherein Figure 1 is a perspective view of the filter as a whole, partly broken away to reveal the interior;

Fig. 2 is a side elevation of one of the filter leaves showing the corrugated grid plate with the mesh removed and at the left with the mesh in place;

Fig. 3 is a much enlarged cross-sectional fragmental view of the center tubular column with the corrugated grid plate extensions and the mesh on opposite sides thereof;

Fig. 3a is a fragmental sectional view of one of the outer edges of the corrugated grid plate with the edge reenforcement secured thereto;

Fig. 4 is a much enlarged cross-sectional view of the upper header and associated parts taken on line 4—4 of Fig. 2;

Fig. 5 is a sectional view on a somewhat smaller scale of the manifold which mounts the group of filter leaves, with one of the lower headers mounted thereon;

Fig. 6 is a plan view of the manifold on a somewhat smaller scale; and

Fig. 7 is a side elevation, partly broken away, of the manifold and the mountings therefor;

Fig. 8 is a longitudinal sectional elevation of the washout fitting and the handwheel for advancing and retracting the sealing cap;

Fig. 9 is a plan view of the same; and

Fig. 10 is an end view looking from the left of Fig. 9.

The filter, as a whole, comprises a cylindrical tank 10 closed at its upper end by a cover 11 carried by a center spindle 12 threaded through the free end of a swinging arm 13 pivoted at its outer end on a post 14. The spindle terminates in a handwheel 15, which permits the cover to be raised and thereafter swung to one side to expose the interior of the tank. When the cover is properly centered and lowered, it will be sealed by clamping screws 16 carried by pivoted brackets 17 and operated by handwheels 18 in a manner well understood in the art. These features are of conventional type and form no part of the invention.

The slurry, containing particles of diatomaceous earth or the like in suspension, is forced in under pressure through an opening 19 near the base of the tank within which is located a group of filter leaves 20 which more particularly form the subject matter of the present invention.

Each of the filter leaves comprises upper header sections 21, lower header sections 22, a vertical tubular column 23, and corrugated grid plates 24 symmetrically extending on opposite sides of the tubular center column.

As shown in Fig. 3, it is preferred to make the center column in two half-cylindrical sections 25 and 26 the former of which is extended integrally on each side to provide a flat inner wing section 27, which merges into the outer grid corrugated plate section 28, which is formed to provide on each side a plurality of outwardly extending crests 29 and intervening channels 30 arranged in staggered relation to one another on opposite sides of the plate. The center tubular column is completed by the provision of the section 26 which terminates in outwardly extending flat wings 31 which are welded or otherwise rigidly united with the wings 27 which afford flat surfaces for the securement of the inner edges of the fine mesh 32 which provides the surface for the accumulation of a layer or deposit of filtering material 33 indicated at the left of Fig. 3. By forming the body of the filter leaf in the manner described, it is possible to press the entire body plate with the exception of the half-tubular section 26 from a single sheet of stainless steel or the like thus avoiding a multiplicity of joints or connections and at the same time securing a maximum of rigidity and freedom from interior protuberances or offsets which would tend to interfere with the smooth and uniform flow of the liquid. Thus constructed each leaf, on opposite sides of the center tubular column, provides a multiplicity of unimpeded smooth surfaced channels within the confines of the mesh so that the liquid after filtration will flow freely either upwardly or downwardly in a vertical direction through the channels thus afforded.

The upper header sections 21 are of split tubular formation and terminate along their lower side in wings 34, which are spaced apart sufficiently to make close abutment with the crests of the corrugations along the upper edge of the grid plate and at the same time present smooth outer surfaces for the attachment thereto of the upper edges of the mesh sections which are preferably secured by soldering while the inner edges of the mesh sections are likewise soldered to the vertically extending united wings 27 and 31 of the center column. By soldering the edges of the mesh to the surfaces thus presented, a close rigid sealed union is provided while at the same time the employment of solder permits the mesh to be disconnected without difficulty for purposes of renewal as occasion may require.

As shown in Fig. 4, the vertical channels afforded by the grid plate open directly into the interior of the upper header sections, and in order to provide a union between the upper header sections and the center tubular column a T-shaped head 35 is employed which affords oppositely facing sockets 36 which receive the inner ends of the header sections 21. The head 35 is also provided with a divided center socket portion 37 which straddles the upper end of the tubular column with its laterally extending united wings 27 and 31, the assembly being firmly joined by brazing or welding to afford divided horizontal header channels at the upper end merging into a center channel for the downflow of filtered liquid which is admitted through the upper portion of the filter leaf.

As shown the upper center of the head is cut away to provide a center opening which is covered by half-cylindrical mesh section 38 upon which the filtering medium will likewise be deposited, and through which air will be expelled.

The inner ends of the lower header sections 22 are similarly united by a head 39 comprising laterally extending sockets 40, an upwardly extending socket 41 and a tubular neck 42 terminating in an arcuate saddle 43 as best shown in Fig. 5. The lower header sections 22 along their upper sides are open and provided with wings 44 which overlap and are secured to the corrugated surfaces of the grid plate and the sockets 40 and 41 are likewise divided to straddle the lateral and vertical wings at their inner juncture and are united by a web 45 which likewise overlaps and is rigidly secured to the wings so that a rigid sealed union will be afforded between the inner ends of the lower header sections and the vertical tubular column, thereby affording a converging point for the flow of liquid down through the tubular column and the inwardly directed flow through the lower header sections. The union also affords greater rigidity of structure with a minimum of weight and a minimum in the number of parts thus united at the base of the filter leaf.

The entire group of filter leaves is supported upon a horizontally extending manifold 46 near the base of the filter tank, which manifold along its upper surface is provided with a multiplicity of closely spaced upstanding nipples 47 each of which is shouldered to afford a seat for a gasket ring 48 against which the inner face of the neck 42 abuts to afford a seal while the nipple itself, in conjunction with the saddle 43, serves to hold the filter leaf firmly in upstanding position upon the manifold, the leaves standing in closely spaced parallel relation as indicated in Fig. 1.

The inner end of the manifold is closed by a screw cap 49 while the outer discharge end 50 is threaded to receive a coupling or the like (not shown), behind which is located a disk gland 51 through which the end of the manifold extends in eccentric relation, as shown, which disk gland is secured by bolts 52 or the like to a ring 53 secured in any suitable manner to the wall of the filter tank, thus permitting the disk to be disconnected, while the low eccentric relation of the manifold increases the space within the tank available for filtering elements of the greatest height which the tank will accommodate. In many cases, however, a concentric arrangement may be preferred.

The disk gland is provided on its inner face with a beveled flange 54 which bears against a packing 55 which lies within a shouldered collar 56 eccentrically mounted on the manifold and rigidly secured and sealed thereon by welding 57 or the like. The collar 55 is provided on its inner side with a peripheral flange 58 which fits snugly within the recessed face 59 of the ring 53 and carries an inwardly projecting pilot pin 60 which registers with an aperture 61 near the inner margin of the recessed ring 53 to assist in the proper positioning of the manifold.

The ends of the upper and lower header sections are closed by caps 63 which may be screwed on to the ends of connecting rods 64 which extend through the upper or lower header sections as the case may be. This permits the plug at each end to be removed for purposes of cleaning.

As shown in Fig. 3a the outer side edges of the grid plate are reenforced by rods 64$^a$ around which are curved vertical edging members 65 of split tubular form provided with inwardly extending wings 66 which embrace the associated edge of the grid plate and which are brazed, welded, or otherwise rigidly united therewith, and the wings afford flat attaching faces for the edges of the mesh on oppostie sides of the wing while the ends of the edging members are rigidly united to the ends of the upper and lower header sections thus providing a suitable finish and reenforcement around all of the edges of the filter leaf.

The base 67 of the tank has in its center an aperature 68 which receives the reduced mouth 69 of a washout fitting 70 of inverted T-shaped formation, secured to the tank by bolts or the like and comprising an upwardly extending neck 71 which on one side merges into an inlet duct 72 and on the other side into a clean out duct 73 of larger diameter, but with the bases of the two ducts lying flush and merging into the base of a center chamber 74. The inlet duct is threaded to receive a coupling or the like to make connection for admitting liquid. The margin of the clean out duct is provided with exterior outstanding threads 75 which receive the inner threads 76 on the flange 77 of a sealing head 78 which carries a packing washer 79 held in place by a disk 80 and a screw 81.

The sealing head is provided with an outwardly extending boss 82 which sockets the threaded inner end 83 of an operating rod 84 which amounts an operating device such as a handwheel 85 on its outer end while the inner threaded end of the rod is locked in place by a cross pin 86.

The base of the boss is enlarged in the form of a shoulder 87 which mounts a laterally extending guide bar 88 held in place by a jamb nut 89, thus affording a mounting for holding the sealing head rigidly on the inner end of the rod, so that by operating the handwheel or other equivalent device, which is conveniently placed beyond the wall of the tank, the sealing head can be screwed in place to seal the washer squarely against the mouth of the outlet duct without the possibility of grit or sediment becoming lodged, as in a valve seat, to impair the effectiveness of the seal thus afforded.

The rod 84 extends through the base of a hanger bracket 90 secured to the rim of the tank and the outer ends of the guide bar 88 are apertured to ride upon guide rods 91, the forward ends of which are carried by the hanger bracket while the rear ends are entered through lugs 92 extending laterally from the side walls of the washout fitting and held rigidly in place by nuts 93. A collar 94 pinned on the operating rod acts as a stop to limit the outward travel of the sealing head and parts associated therewith.

*Operation*

In operation, a slurry of the proper consistency, having particles of diatomaceous earth held in suspension, is first admitted under pressure through the opening 19, or through the inlet duct 72 to the interior of the tank and is deposited on the surface of the mesh to build up a precoating layer of filtering material of the desired thickness. Any of the solid slurry particles permeating the mesh during this precoating period, will enter into the filter leaves 20 and thence into the center column 23 for discharge at its lower end into the manifold 46 to be returned into the slurry stream for recirculation until the outgoing stream runs clear at which time the leaves are in condition for filtering. The liquid to be filtered is thereupon admitted through the inlet opening 19 or the inlet duct 72 into the clear stream to permeate through the filtering material and flow into the oppositely disposed vertical channels 30 provided by each of the grid sections. The liquid entering through the upper and lower portions of the leaves will be drawn upwardly and downwardly into the respective header sections 21 and 22, the former down through the tubular column 23 to the point of junction with the lower header section, and all the liquid so filtered will pass downwardly into the manifold 46 for discharge through its open end 50. The manifold which is removably supported in the base of the tank affords a mounting for the entire group of filter leaves which can be individually mounted upon the nipples or removed therefrom without difficulty.

When it is desired to flush out the filter, and remove the filtering material from the mesh surface, the usual method is to swing back the cover and flush the surfaces of the leaves with a hose. It is also possible to direct a counter-current through the filter which will discharge the accumulated deposit on the leaves so that it can be removed from the base of the tank through the outlet duct of the wash-out fitting and wasted, if desired, or through the inlet duct and saved for the purpose of reclaiming the filtering medium. Also by removal of the caps 63, the header interiors are exposed for convenient clean-out in any of the usual ways. The channels afforded by the corrugated grid plates are unobstructed by cross-partitions or similar interruptions in their continuity, so that no obstructions will be afforded for the accumulation of sediment or the like, and likewise the constant and unimpeded flow of the liquid will scour the surfaces and constantly keep them in a clean and sanitary condition.

Although the opening 19 will ordinarily afford the point of connection for the inflowing liquid, the inlet duct 72 may be likewise employed for this purpose. The employment of the flat-faced sealing head, movable outwardly and away from the clean out duct 73, provides for an unrestricted discharge from the base of the tank and insures against the lodgment of grit or sediment. This sealing head which normally closes the clean out duct is opened primarily for clean out purposes and at times when the flow of liquid to be filtered is shut off from the inlet duct 72. The employment of a handwheel on an extended operating rod affords means for operating the sealing head from a convenient point and away from the outflow of liquid from the washout fitting.

Although for structural reasons and also for the sake of economy it is desirable to form one-half of the center tubular column integrally with the outstanding corrugated grid sections, it will be understood that the method of mounting the sections may be modified and that the invention consists primarily in the formation of the filtering and grid plate surfaces rather than in the mounting provided for retaining the same in proper position while affording channels for the withdrawal of the filtered liquid.

I claim:

1. In a filter, a filter leaf comprising a pair of laterally spaced, transversely aligned corrugated grid plates affording on each face a plurality of channels, headers into which the ends of the plates are entered to afford egress of liquid flowing through the channels, a mesh overlying the faces of the corrugated grid plates to afford surfaces for the deposit of a filtering medium, and a tubular connection between the headers, located in the space between the corrugated plates and supporting the same.

2. In a filter, a filter leaf comprising a pair of laterally spaced, transversely aligned corrugated grid plates affording on each face a plurality of channels, headers into which the ends of the plates are entered to afford egress of liquid flowing through the channels, a mesh overlying the faces of the corrugated grid plates to afford surfaces for the deposit of a filtering medium, a hollow column communicating with the headers and located between and having the corrugated plates connected to it and supporting said plates.

3. In a filter, a filter leaf comprising a pair of laterally spaced, transversely aligned corrugated grid plates affording on each face a plurality of channels, horizontal headers into which the ends of the corrugated plates are entered to afford egress for liquid flowing through the channels, a mesh overlying the faces of the corrugated grid plates to afford surfaces for the deposit of a filtering medium, and a hollow vertical column connected to and communicating with the headers and located between and supporting the grid plates.

4. In a filter, a filter leaf comprising a pair of laterally spaced, transversely aligned corrugated grid plates affording on each face a plurality of channels, horizontal headers into which the ends of the corrugated plates are entered to afford egress for liquid flowing through the channels, a mesh overlying the faces of the corrugated grid plates to afford surfaces for the deposit of a filtering medium, and a hollow vertical column connected to and communicating with the headers and located between the grid plates and formed with laterally extending attaching wings secured to said plates.

5. In a filter, a filter leaf comprising a pair of laterally spaced, transversely aligned corrugated grid plates affording on each face a plurality of channels, horizontal headers into which the ends of the corrugated plates are entered to afford egress for liquid flowing through the channels, a mesh overlying the faces of the corrugated grid plates to afford surfaces for the deposit of a filtering medium, and a hollow vertical column located between the grid plates and supporting the same, upper and lower coupling members connecting said column with the headers, the upper coupling member being approximately T-shaped and having a recess located between the connected ends of the upper headers and a wire mesh covering the recess and adapted also to receive filtering medium.

6. In a filter, a filter leaf comprising a pair of laterally spaced, transversely aligned corrugated grid plates affording on each face a plurality of channels, horizontal headers into which the ends of the corrugated plates are entered to afford egress for liquid flowing through the channels, a mesh overlying the faces of the corrugated grid plates to afford surfaces for the deposit of a filtering medium, a hollow vertical column located between the grid plates and supporting the same, upper and lower coupling members connecting said column with the headers, the upper coupling member being approximately T-shaped and having a recess located between the connected ends of the upper headers and a wire mesh covering the recess and adapted also to receive filtering medium, and the lower coupling member terminating in an arcuate saddle.

WILLIAM B. KLEIN.

REFERENCES CITED

The following references are of record in the file of this patent:

UNITED STATES PATENTS

| Number | Name | Date |
| --- | --- | --- |
| 1,261,895 | Bartholomew | Apr. 9, 1918 |
| 482,790 | Giesler | Sept. 20, 1892 |
| 839,772 | Krause | Dec. 25, 1906 |
| 1,919,448 | Norquist et al. | July 25, 1933 |
| 2,035,851 | Walker | Mar. 31, 1936 |
| 1,370,470 | Martel | Mar. 1, 1921 |
| 2,359,368 | Klopfenstein | Oct. 3, 1944 |
| 649,364 | Scheibler | May 8, 1900 |
| 1,818,623 | Holcomb et al. | Aug. 11, 1931 |

FOREIGN PATENTS

| Number | Country | Date |
| --- | --- | --- |
| 18,409 | Australia | Mar. 20, 1930 |